United States Patent [19]

Crosby

[11] 4,026,499

[45] May 31, 1977

[54] GLASS BALLOONS AND METHOD FOR MAKING SAME

[76] Inventor: David Rogers Crosby, 26 Colonial Ave., Haddonfield, N.J. 08033

[22] Filed: Mar. 15, 1976

[21] Appl. No.: 667,015

[52] U.S. Cl. .................................... 244/31; 46/87; 65/21; 65/34; 65/82; 65/84; 206/.6; 425/804
[51] Int. Cl.² ...................... B64B 1/62; C03B 9/00; A63H 27/10
[58] Field of Search ................... 46/87–90; 244/31, 33; 343/706; 65/21, 22, 34, 110, 82, 84; 206/.6; 425/804

[56] References Cited

UNITED STATES PATENTS

| 2,165,610 | 7/1939 | Boyle | 244/33 |
| 2,202,337 | 5/1940 | Cohn | 65/22 X |
| 2,227,757 | 1/1941 | Loepsinger | 65/34 |
| 2,649,993 | 8/1953 | Burdick et al. | 206/.6 |
| 3,288,398 | 11/1966 | Axelsson | 244/31 |

Primary Examiner—Robert L. Lindsay, Jr.

[57] ABSTRACT

A glass balloon that floats in air. An assembly of glass balloons that form a slab of foam that floats in air. A process for making glass balloons employing: two nested furnaces, pre-heated helium, a moving furnace, and a refrigerated seal-off chamber.

9 Claims, 1 Drawing Figure

U.S. Patent    May 31, 1977    4,026,499
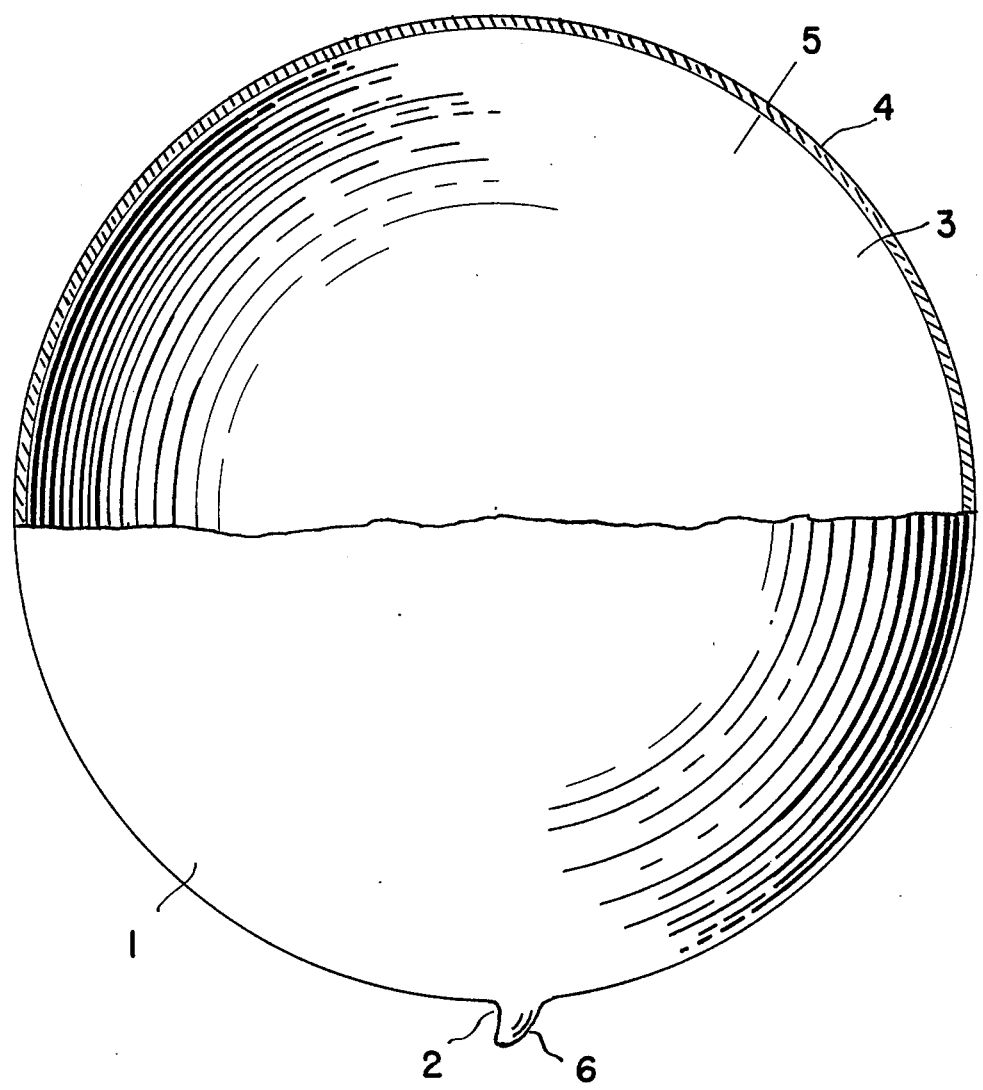

GLASS BALLOONS AND METHOD FOR MAKING SAME

BACKGROUND OF INVENTION

The present invention relates to glass balloons and to assemblies of glass balloons. A single glass balloon is valuable as an ornament and also as a device for demonstrating properties of the air. Assemblies of glass balloons may constitute a glass foam that is buoyant in air. Slabs of such air-buoyant glass foam can be used to construct artificial clouds.

The beautiful optical and mechanical properties of glass are widely admired. The delightful response of buoyant rubber balloons to the air currents in a room are also widely admired. The glass balloon combines both of these long-established attractions into a single device. Experience teaches that many persons are fascinated by the sight of a glass balloon.

The glass balloon has the further advantage of having an expected buoyant life of a hundred or a thousand times longer than the expected life of a rubber balloon of the same diameter.

Plastic or rubber balloons are widely used as indicators of outdoor air currents by professional meteorologists. Rubber and plastic balloons are not well suited, however, for studying air currents within a building. The high leakage rate of the light gas through the envelope of such a balloon destroys the ability of the balloon to maintain the equilibrium ballast condition for more than a few minutes. In contrast, the glass balloon can be easily ballasted to an equilibrium condition and will hold such ballast condition for days and so is well suited for indicating indoor air currents.

Glass foam has a wide commercial use as a foam buoyant in water, and slabs of such glass foam are used, for example, to support pipes in crossing a lake. However, no glass foam that is buoyant in air has apparantly been constructed prior to this invention. By sealing the individual glass cells when most of their envelope is approximately at room temperature, this invention teaches how glass foam buoyant-in-air can be constructed. Up to the time of this invention, several experts in the construction of devices from glass have considered the construction of such buoyant-in-air glass envelopes as impractical or impossible.

SUMMARY OF INVENTION

An approximately spherical glass envelope, having a wall so thin that the diameter of the envelope is at least 11,700 times the wall thickness; the envelope containing a gas lighter than air, such as helium or hydrogen; the envelope being sealed so as to prevent the light gas from escaping.

Such a device constitutes a glass balloon that will float in air and have a buoyant life, as limited by permeation of the gas through the wall of the envelope, of many years compared to a few hours for the previously available balloons of the same size.

DESCRIPTION OF THE DRAWING

The single view shows a spherical glass balloon, the top part of the drawing showing a partial section through the balloon. The bottom part of the drawing shows a partial view of the exterior surface, including the seal-off area.

In the drawing is shown the glass balloon, the lower part of the drawing showing a portion of the exterior surface 1 and the seal-off area 2. The upper part of the drawing shows a partial cross-section of the balloon, and thus shows part of the interior surface 3 and a partial cross-section of the wall 4. In order to distinctly show both of its surfaces, the thickness of the wall in the drawing 5 is exaggerated, being about 400 times the thickness of the wall in a drawing that was made strictly in proportion.

The invisible gas, such as helium, within the balloon is not indicated in the drawing. No attachment to the balloon is shown, although frequently a tether of thread is attached to the seal-off tit 6, or the balloon is restrained by a delicate piece of netting laid over the top of the balloon.

The glass used in the balloon can be a common commercial variety sold from stock in the form of glass tubing for general use:

| Approximate principal composition | | |
|---|---|---|
| | silica | 73% |
| | sodium oxide | 17% |
| | calcium oxide | 5% |
| Density, grams per milliliter | | 2.5 |
| Softening temperature, degrees centigrade | | 700 |

Other types of glass may be chosen for special properties, such as for maximum strength, hardness or toughness.

Depending on the size of the balloon to be made and the process of manufacture, tubing of various diameters and wall thickness will be found most suitable. For balloons of 100 millimeters diameter, standard glass tubing of 5 millimeters outside diameter and about 3 millimeters inside diameter has been found most suitable. A length of such tubing 264 millimeters long is used for each balloon.

The helium used in blowing the balloon is of standard purity as sold by vendors of bottled gas for industrial purposes.

The completed balloon is often noticeably non-spherical, although some balloons appear spherical to the unaided eye. Some of the balloons contain areas where color bands or color discs can be clearly seen by the unaided eye, as would be expected from transparent films with two very smooth surfaces and having a film thickness of but a few wave lengths of visible light.

The approximate parameters of a particular balloon at sea-level elevation and at a temperature of 20° centigrade are:

Diameter: 100 millimeters
Envelope thickness: 5.4 microns
Mass of glass: 486 milligrams
Envelope volume: 0.524 liters
Mass of helium: 91 milligrams
Mass of displaced air: 631 milligrams
Absolute pressure in interior of envelope:
 1.04 normal atmospheres
Tensile stress in wall of envelope: 184 normal
 atmospheres
Loss of helium through wall of envelope:
 0.29 microgram per day The ratio of diameter to wall thickness for the above parameter set is 18,500 but when a less dense glass is used and the lightest gas (hydrogen) is used, this ratio may go as low as 11,700 irrespective of the diameter of the balloon, but not sensibly lower.

A glass foam, buoyant in air, may be constructed by gluing, or otherwise fastening together a large number of glass balloons so the resultant structure is a rigid buoyant slab. Such buoyant slabs can be used to construct artificial clouds, or cargo-carrying barges, or personnel carriers that float in air. No such rigid foam-like buoyant-in-air material has been available previous to this invention.

The average diameter of the cells in the foam may be considerably smaller or larger than the 100 millimeters of the particular balloon described above.

In the fabrication of a glass balloon, a hollow bud is formed on the end of a piece of glass tube, in a particular case the bud is about 13 millimeters in diameter. The formation of such buds is a well known art among professional glassblowers.

The volume of glass used in making the bud must be carefully chosen so the diameter of the resulting balloon envelope is at least 11,700 times the thickness of the wall of the envelope, otherwise the sealed-off envelope will not float in air. To give a more useful buoyancy to the balloon, a ratio of 18,000 or more is frequently used. Much higher ratios can be employed to get buoyancy, but the fragility of the envelope increases with the increase of this ratio.

After the bud is heated in the furnace, it is separated from the furnace and the cooling of the bud begins. The proper use of time is essential in the making of glass balloons, as such balloons expand and cool in a fraction of a second, faster than can be monitored by the unaided eye. The estimated time for a glass envelope suitable for a balloon of 100 millimeters diameter to cool in normal air from the plastic temperature to the rigid state is only 0.06 seconds. The essential task is to expand the bud as quickly as possible in an atmosphere as hot as possible. There is not enough time to remove the bud from the furnace in the normal manner. If the bud were removed slowly, it would cool too much; if the bud were removed quickly, the acceleration forces on the hot glass would produce objectionable distortion in the bud. A desirable arrangement is to have a cylindrical furnace mounted on a carriage that moves on guide rails. In a particular case, the furnace has an inside diameter of 34 millimeters, is 114 millimeters long, and drops vertically 196 millimeters After the bud is heated, an electric timer operates a latch that permits the furnace to quickly drop, providing a clear space for the stationary bud to expand within the expansion chamber. The dropping of the furnace actuates switches that in turn energize electric valves that permit the helium to flow into the glass tube. Since the glass bud, weighing about 486 milligrams, is at a temperature of about 750° centigrade, the injection of a few milligrams of helium at room temperature would objectionably further cool the glass bud, particularly since the specific heat of helium is about 20 times the specific heat of commom glass. A premature cooling of the bud as little as 20° can be highly detrimental to the expansion of the bud.

It has been found advantageous to inject the helium at a high temeprature to delay cooling of the bud. This high temperature can be imparted to the helium by the hot walls of the glass tube, providing the length of the glass tubing and the inside diameter and the temperature of the glass tubing are suitably chosen. An experimental study of these parameters will yield a favorable combination that heats the helium gas, for example, so it is hot enough to char common newsprint paper. In a particular case, a 92 millimeter length of glass tube was inside the expansion chamber and the remaining 159 millimeters of the tube were used in passing through the top wall of the furnace and in attaching the rubber hose to the tube.

To gain further time in expanding the soft bud, and also to suitably heat the glass tube, it has been found desirable to conduct the expansion in an atmosphere where the temperature is carefully optimized by experiment. In a particular case, the best temperature for the expansion chamber was found to be 545° centigrade. Two cylindrical and coaxial electric furnaces were used, the fixed outer furnace being 178 millimeters in inside diameter and used as the expansion chamber. In each furnace, the electric heating elements are embedded in the walls of the furnace. The furnace temperatures are monitored by suitable thermocouples and milli-voltmeters. The voltages applied to the heating elements are carefully monitored and controlled by a voltmeter and two variable-ratio transformers.

The temperature of the outer furnace must be low enough so the glass envelope will solidify with a critical quickness. Thus as the bud expands, the thinner sections of the bud cool faster than the typical sections, so the proper expansion is non-regenerative in that a uniformity of wall thickness in the final envelope is promoted. When the outer furnace is too hot, regenerative expansion may occur permitting the envelope to distort and often to rupture, as the thinner sections get proportionately thinner as the envelope expands. If the outer furnace is 5° or 10° too cold, the bud will solidify before it expands to a diameter that complies with the necessary 11,700 ratio.

When the helium is injected too fast, the jet of hot gas can force a hole in the envelope at a point opposite to where the helium enters the bud. There is only a small range of allowable pressures for the helium inlet, as an injection at a pressure that is too low will not expand the bud fast enough to avoid premature solidifying. In the particular case, an initial injection pressure of 1.09 atmospheres has been found suitable.

If more than about 40% of the total amount of helium that the balloon will eventually contain is injected into the hot bud, the envelope will likely burst due to excess pressure. The injected helium quickly attains a temperature of at least 545° centigrade, so its volume is about 2.8 times its volume at room temperature. To avoid an initial oversupply of helium, it has been found useful to inject a measured volume of helium into the expanding bud by storing the initial supply in a steel cylinder with movable piston. In a particular case the piston is 64 millimeters in diameter and the piston travels 49 millimeters. A force is applied to the piston, such as by a weight, to insure the storage pressure is proper and that the initial delivery pressure is adequate to operate the associated pressure regulator. A second pressure regulator is also employed to insure that the delivery of helium, after the expansion has taken place, is at a lower pressure, such as 1.03 atmospheres.

With the above techniques and a careful experimental investigation, an optimum time in the inner furnace, optimum temperatures for the inner and outer furnaces, optimum initial and final pressures for the helium, and optimum volume for initial helium injection can all be determined to yield a suitable envelope.

When the envelope is removed from the outer furnace, it cools to room temperature and so requires additional helium. Such helium is supplied through the same rubber hose that is connected to the glass tube at the beginning of the expansion.

In the seal-off of the envelope from the glass stem, it is desirable to raise the temperature of the glass in the seal-off area so that the glass is soft and readily deformed and thus can be shaped to produce a tight seal. If the glass is not soft but merely in the plastic state, a seal can be made but it may not be tight enough to be a permanent barrier to the escape of helium.

However the hot soft glass at seal-off can be objectionably distorted by pressures within the envelope, and a blow-out may result in the area of the seal. It is found desirable to refrigerate the envelope during the seal-off process so the pressure of the helium is reduced but the mass of the helium is not reduced. Thus the helium schedule for the envelope is approximately:

| Condition envelope | Hellium Schedule Helium milligrams | Pressure atmospheres | Envelope temperature Centigrade |
| --- | --- | --- | --- |
| In expansion chamber after expansion | 32 | 1.03 | 545 |
| At room temperature | 90 | 1.03 | 20 |
| In seal-off box | 91 | 1.007 | 11 |
| Finished balloon at room temperature | 91 | 1.04 | 20 |

The originally added helium is 32 grams and the ultimate mass of helium is 91 grams which original 32 grams is approximately ⅓ of the ultimate volume of helium in the finished balloon.

It is convenient to mount the envelope inside a refrigerator, a commercial refrigerator with a cubical shaped cold compartment of about 300 millimeters on a side is satisfactory. The stem attached to the envelope is arranged to extend through the wall of the refrigerator, so the seal-off operation is conveniently executed outside the refrigerator with a seal-off torch. In the seal off area, the wall of the refrigerator is thin, being comprised of a thin sheet of stainless steel.

During the seal-off, it is desirable to have some slight positive differential pressure within the envelope, as the envelope is too thin to be self-supporting. Two other methods of reducing the differential pressure on the envelope during the seal-off are: to apply a cold jet to the envelope; or to have the seal-off operation take place in a chamber within which the pressure is above ambient and is substantially the same as the final working pressure for the interior of the balloon, for example 1.04 atmospheres.

I claim:

1. An approximately spherical envelope of glass, containing a lighter-than-air gas, the combined weight of the glass and of the contained gas being less than the weight of the displaced air; a gas-tight seal integral with the envelope, the mass of the gas within the envelope so choosen that the principal stress in the envelope is tension due to the internal gas pressure said pressure having a slightly positive pressure in relation to ambient.

2. An assembly of several envelopes as in claim 1, comprising a structure that is buoyant in air, the assembly realized by holding the envelopes together either by an adhesive or by a delicate honey-comb like cage.

3. The process of constructing a glass envelope containing a lighter-than-air gas, the combined weight of the glass and of the contained gas being less than the weight of the displaced air, and employing a mold-free glass blowing sequence in which a lighter-than-air gas is used to expand a hot gas bud and the injection of the gas is regulated said that the volume of the gas is measured to inject approximately ⅓ of the ultimate gas into the envelope, lowering the temperature of the envelope and while lowering the temperature, injecting additional gas into the envelope to maintain a substantially constant pressure, said pressure being slightly above atmospheric.

4. A process as in claim 3 in which the inlet temperature of the gas at the bud is so high that the thermal energy of the gas is a significant amount of the thermal energy in the hot glass bud being expanded.

5. A process as in claim 3 in which the glass bud being expanded is integral with a glass tube of suitable length and diameter so the temperature of the glass tube heats the gas to a significant degree as the gas passes through the tube.

6. A process as in claim 3 in which a set of two nested furnaces are employed, the outer furnace providing a precisely controlled temperature for the expansion of the envelope and the inner furnace providing a precisely controlled temperature to lower the viscosity of the bud so the bud is ready for blowing into the shape and size of the final envelope.

7. A process as in claim 6 in which the inner furnace is movable so the glass bud is held fixed in place after it is heated and prior to its expansion in the outer furnace.

8. A process as in claim 3 and the use of a refrigerated chamber or of a cold air blast to reduce the temperature of the envelope and of the gas therein to a precise degree during the seal-off phase.

9. A process as in claim 3 and the use of a chamber enclosing both the envelope and the seal-off equipment, which chamber is pressurized to be at least 1% above the ambient pressure.

* * * * *